(12) United States Patent
Holtby et al.

(10) Patent No.: US 9,695,643 B2
(45) Date of Patent: Jul. 4, 2017

(54) PIPE MAT AND METHOD FOR USING SAME FOR COLLECTING FLUIDS DRAINING FROM DRILL PIPE

(71) Applicant: Katch Kan Holdings Ltd., Edmonton (CA)

(72) Inventors: Quinn A. J. Holtby, Edmonton (CA); Dallas Laird Greenwood, Edmonton (CA)

(73) Assignee: Katch Kan Holdings Ltd., Edmonton (CA)

( * ) Notice: Subject to any disclaimer, the term of this patent is extended or adjusted under 35 U.S.C. 154(b) by 0 days.

(21) Appl. No.: 15/145,386

(22) Filed: May 3, 2016

(65) Prior Publication Data

US 2016/0319608 A1 Nov. 3, 2016

Related U.S. Application Data

(62) Division of application No. 13/542,567, filed on Jul. 5, 2012, now Pat. No. 9,353,580.
(Continued)

(51) Int. Cl.
*F16L 3/22* (2006.01)
*E21B 17/00* (2006.01)
(Continued)

(52) U.S. Cl.
CPC .......... *E21B 17/006* (2013.01); *B08B 17/025* (2013.01); *E21B 19/00* (2013.01); *F16L 3/00* (2013.01)

(58) Field of Classification Search
CPC .......... E21B 17/006; E21B 19/00; F16L 3/00; B08B 17/025
See application file for complete search history.

(56) References Cited

U.S. PATENT DOCUMENTS

| 4,502,653 A | 3/1985 | Curtis, Jr. |
| 4,744,710 A | 5/1988 | Reed |

(Continued)

FOREIGN PATENT DOCUMENTS

| CA | 2 390 828 A1 | 12/2003 |
| CA | 145565 | 1/2013 |

(Continued)

OTHER PUBLICATIONS

Katch Kan® Limited, "Katch Matt™ Stab Mat," 1 page.
(Continued)

*Primary Examiner* — Amy Sterling
(74) *Attorney, Agent, or Firm* — Seed IP Law Group LLP (57) ABSTRACT

A pipe mat for use with a tubing tray for receiving, organizing and storing drill pipe tripped out of a drill string on a drilling rig has a plurality of substantially parallel and spaced-apart support rails to form a plurality of drain channels disposed between adjacent pair of support rails. A plurality of substantially parallel and spaced-apart nub rails is disposed on the plurality of support rails. The nub rails are substantially orthogonal to the support rails, thereby forming a lattice structure having openings disposed between the nub rails that are in communication with the drain channels. A plurality of spaced-apart pipe nubs extend upwardly from the nub rails, which hold a drill pipe in place when an end of the drill pipe is placed onto one of the pipe nubs. A method for collecting fluids draining from drill pipe uses the pipe mat with the tubing tray.

8 Claims, 8 Drawing Sheets

Related U.S. Application Data (60) Provisional application No. 61/647,393, filed on May 15, 2012.

(51) Int. Cl.
   *F16L 3/00* (2006.01)
   *E21B 19/00* (2006.01)
   *B08B 17/02* (2006.01)

(56) References Cited

U.S. PATENT DOCUMENTS

| | | |
|---|---|---|
| 5,211,244 A | 5/1993 | Arterbury |
| 5,343,943 A | 9/1994 | Norris et al. |
| 5,390,789 A | 2/1995 | Darby |
| 5,833,057 A | 11/1998 | Char et al. |
| 6,127,015 A | 10/2000 | Kessler |
| 6,132,684 A | 10/2000 | Marino |
| 6,954,975 B2 | 10/2005 | Dolinski |
| 7,144,201 B2 | 12/2006 | DeArmond, Jr. |
| 8,281,952 B2 | 10/2012 | Robellard et al. |
| 8,584,775 B2 | 11/2013 | Baugh |
| 8,708,295 B2 | 4/2014 | Barthelmie et al. |
| 2005/0115513 A1 | 6/2005 | Bauman |
| 2006/0218872 A1 | 10/2006 | Bigott |
| 2007/0089766 A1 | 4/2007 | Fanourgiakis et al. |
| 2007/0125725 A1 | 6/2007 | Kemper et al. |
| 2012/0073831 A1* | 3/2012 | Gibbens .......... E21B 21/01 166/382 |
| 2012/0100046 A1* | 4/2012 | Kelsall .......... F01N 3/0211 422/311 |
| 2012/0138765 A1 | 6/2012 | Barthelmie et al. |
| 2012/0258267 A1 | 10/2012 | Kroll et al. |
| 2013/0306804 A1 | 11/2013 | Holtby et al. |
| 2016/0206176 A1* | 7/2016 | Eilmus .......... A47J 47/20 |
| 2017/0036582 A1* | 2/2017 | MacNeil .......... B60N 3/046 |

FOREIGN PATENT DOCUMENTS

| | | |
|---|---|---|
| CA | 2 777 161 A1 | 11/2013 |
| EP | 0117707 B1 | 7/1988 |

OTHER PUBLICATIONS

Katch Kan® Limited, "Katch Mat™," 1 page.
Katch Kan® Limited, "Operator Advantages," 2008, 4 pages.
Katch Kan® Limited, "Well Servicing ZSS™ Solution," 1 page.
Katch Kan® Limited, Catalogue, 2007, 6 pages.
Katch Kan® Limited, Product Designs for "Rig Safety System™ (RSS™)," "Zero Spill System™ (ZSS™)," "Well Servicing Zero Spill System™," 2 pages.
Katch Kan® Limited, Screenshot from animation, 2006, 1 page.

* cited by examiner

PIPE MAT AND METHOD FOR USING SAME FOR COLLECTING FLUIDS DRAINING FROM DRILL PIPE

CROSS REFERENCE TO RELATED APPLICATIONS

This application claims the benefit of U.S. Provisional Application No. 61/647,393, filed May 15, 2012, and is a divisional of U.S. application Ser. No. 13/542,567, filed Jul. 5, 2012, the entire disclosures of which are hereby incorporated by reference herein.

BACKGROUND

Technical Field

The present disclosure is related to the field of pipe mats, in particular, pipe mats for use with tubing trays used on drilling rigs for organizing and placing drill pipe on when being tripped in or out of a drill string, and methods for collecting fluids draining from the drill pipe.

Description of the Related Art

There is a need for a pipe mat to be used, in conjunction with a tubing tray that the pipe mat is placed in, to receive, organize and store drill pipe on when being tripped in or out of a drill string, and to provide means and a method for receiving fluids draining from the drill pipe and channeling the fluids away from the drill pipe for storage, recycling or disposal after the drill pipe has been removed from the pipe mat.

BRIEF SUMMARY

A pipe mat is provided for use with a tubing tray for receiving, organizing and storing drill pipe tripped out of a drill string on a drilling rig. In some embodiments, the pipe mat can comprise a plurality of substantially parallel and spaced-apart support rails to form a plurality of drain channels disposed between adjacent pair of support rails, a plurality of substantially parallel and spaced-apart nub rails disposed on the plurality of support rails, the nub rails substantially orthogonal to the support rails thereby form a lattice structure having openings disposed between the nub rails that are in communication with the drain channels, and a plurality of spaced-apart pipe nubs extending upwardly from the nub rails, which are configured to hold a drill pipe in place when an end of the drill pipe is placed onto one of the pipe nubs.

In some embodiments, a method is provided for collecting fluids draining from drill pipe tripped out of a drill string on a drilling wherein a pipe mat can be placed in a tubing tray to receive the drill pipe. An end of the drill pipe can be placed onto a pipe nub to hold the drill pipe in position. Fluids in the drill pipe can drain through the openings disposed through the pipe mat into the drain channels to collect in the tubing tray.

Broadly stated, in some embodiments, a pipe mat is provided for use with a tubing tray for receiving, organizing and storing drill pipe tripped out of a drill string on a drilling rig, the pipe mat comprising: a plurality of substantially parallel and spaced-apart support rails, thereby forming a plurality of drain channels, wherein each drain channel is disposed between each adjacent pair of support rails; a plurality of substantially parallel and spaced-apart nub rails disposed or supported on the plurality of support rails, wherein the plurality of nub rails are substantially orthogonal to the plurality of support rails thereby forming a lattice or matrix-type structure thereby forming openings disposed between adjacent pairs of nub rails wherein the openings are in communication with the drain channels; and a plurality of spaced-apart pipe nubs extending upwardly from at least one of the plurality of nub rails, the pipe nubs configured to hold a drill pipe in place when an end of the drill pipe is placed onto one of the pipe nubs.

Broadly stated, in some embodiments, each of the pipe nubs can comprise a triangular profile or cross-sectional shape.

Broadly stated, in some embodiments, the pipe mat can further comprise a corner bumper disposed on at least one corner of the pipe mat.

Broadly stated, in some embodiments, at least one of the support rails can be configured as an end support rail.

Broadly stated, in some embodiments, the openings disposed between at least one of the end support rails and its adjacent support rail can comprise an elongated or oval configuration or shape.

Broadly stated, in some embodiments, at least one of the end support rails can comprise a plurality of cutaways disposed along an outer edge thereof.

Broadly stated, in some embodiments, the cutaways can comprise a semicircular configuration or shape.

Broadly stated, in some embodiments, a method is provided for collecting fluids draining from drill pipe tripped out of a drill string on a drilling rig, the method comprising the steps of: providing a pipe mat for use with a tubing tray for receiving, organizing and storing drill pipe thereon, the pipe mat comprising: a plurality of substantially parallel and spaced-apart support rails, thereby forming a plurality of drain channels, wherein each drain channel is disposed between each adjacent pair of support rails, a plurality of substantially parallel and spaced-apart nub rails disposed or supported on the plurality of support rails, wherein the plurality of nub rails are substantially orthogonal to the plurality of support rails thereby forming a lattice or matrix-type structure thereby forming openings disposed between adjacent pairs of nub rails wherein the openings are in communication with the drain channels, and a plurality of spaced-apart pipe nubs extending upwardly from at least one of the plurality of nub rails, the pipe nubs configured to hold a drill pipe in place when an end of the drill pipe is placed onto one of the pipe nubs; placing the pipe mat into the tubing tray; and placing an end of a drill pipe tripped out of the drill string onto one of the pipe nubs disposed on the pipe mat, wherein fluids disposed within the drill pipe can drain from the drill pipe through the openings into the drain channels and collect in the tubing tray.

DETAILED DESCRIPTION

Figure 1:
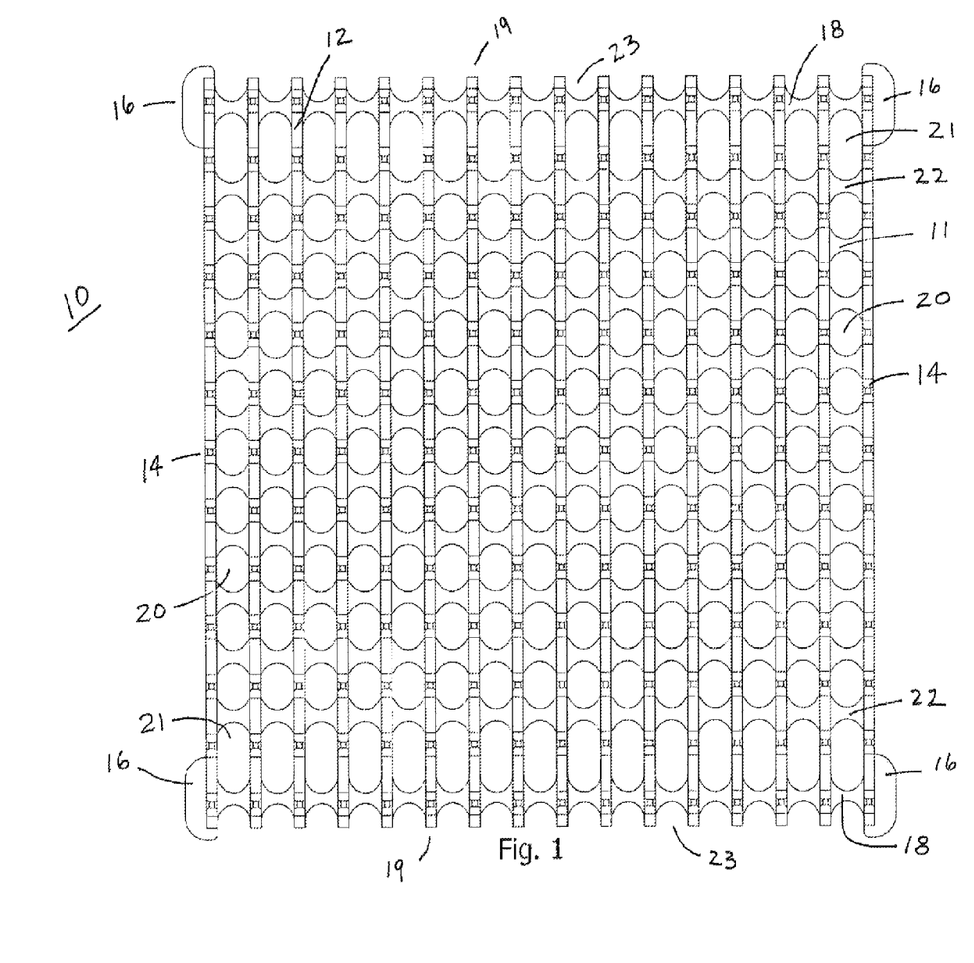
FIG. 1 is a top plan view depicting one embodiment of a pipe mat.
Figure 2:
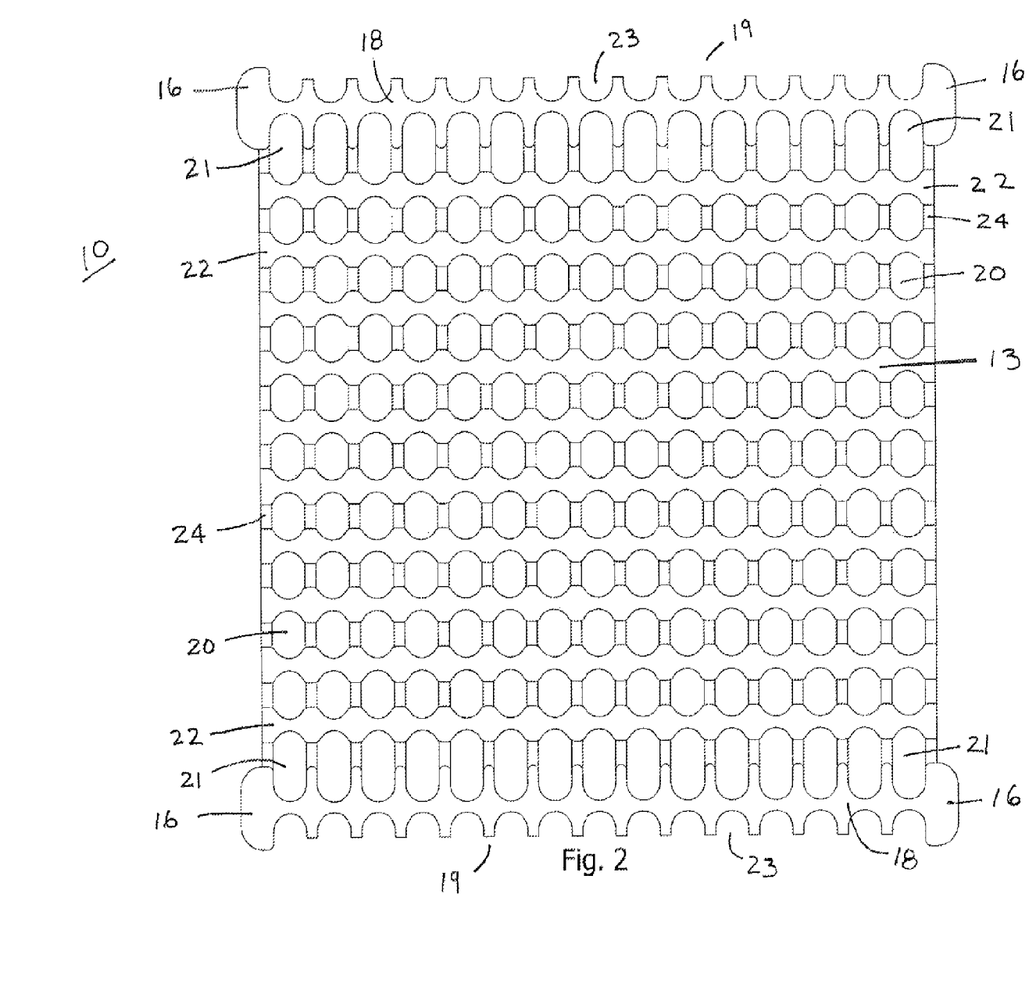
FIG. 2 is a bottom plan view depicting the pipe mat of FIG. 1.
Figure 3:
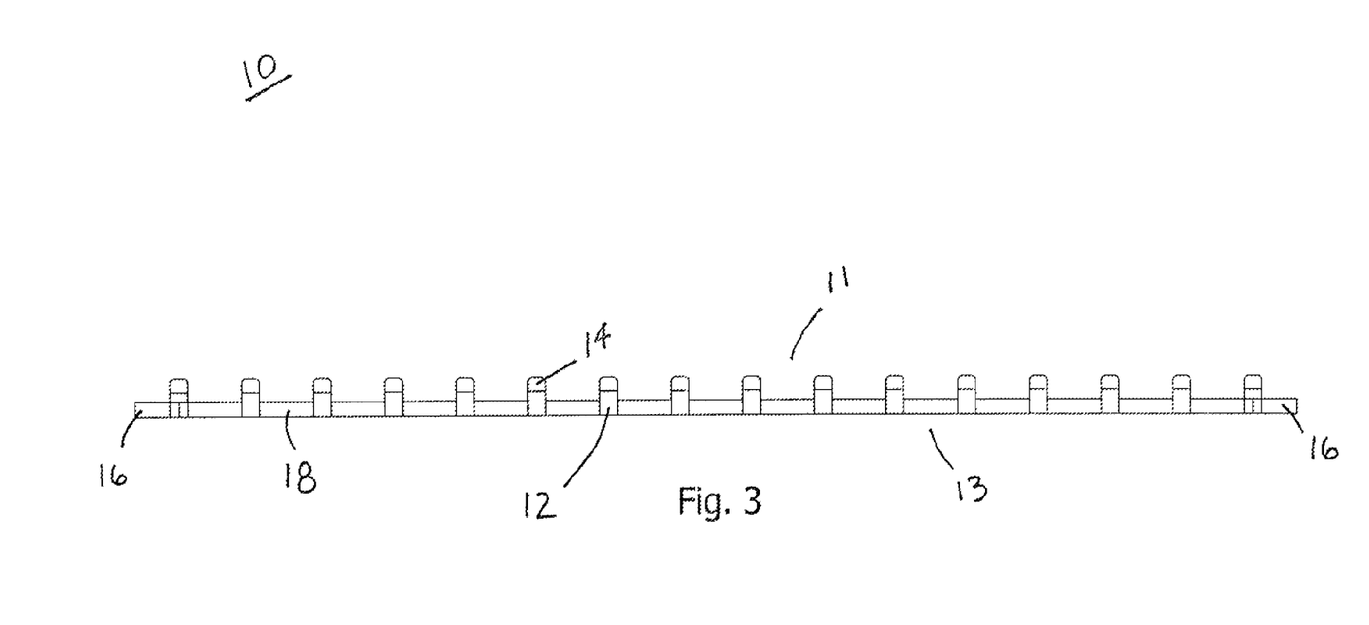
FIG. 3 is a front elevation view depicting the pipe mat of FIG. 1.
Figure 4:
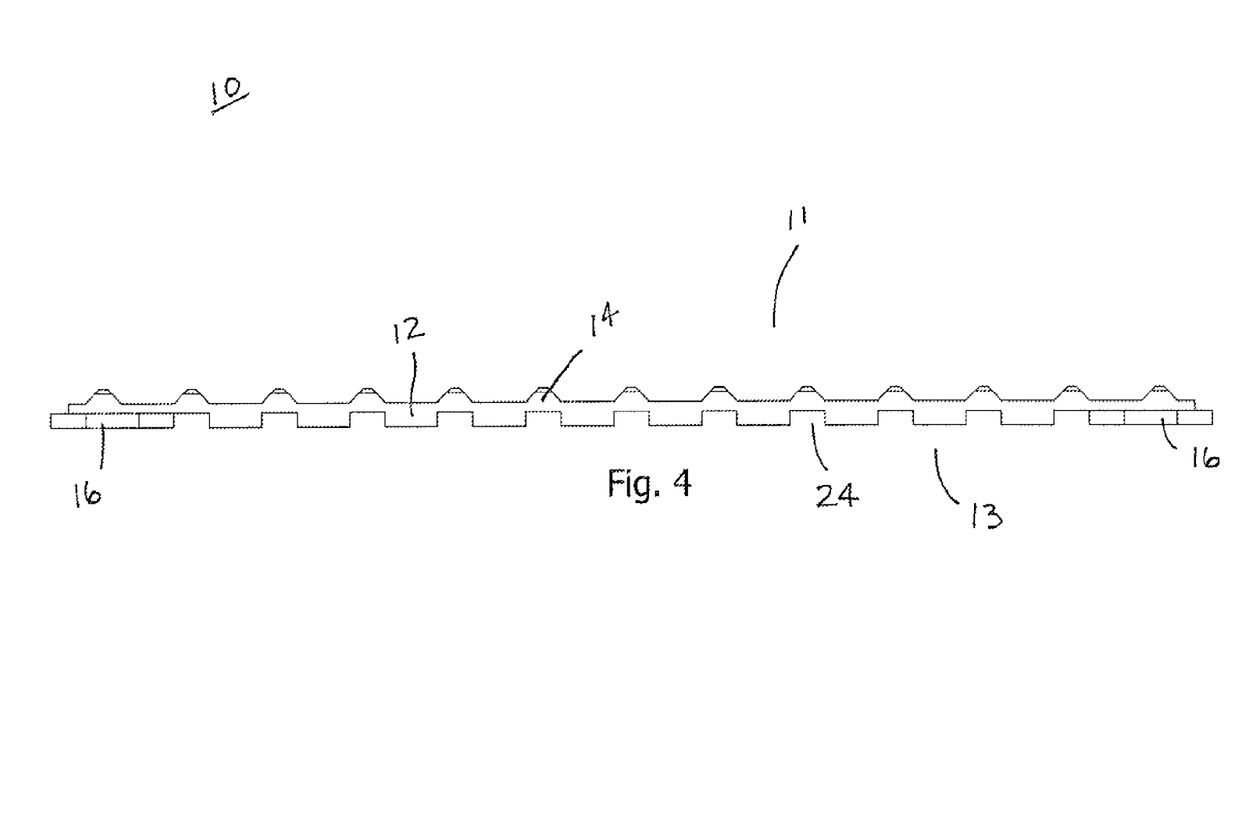
FIG. 4 is a side elevation view depicting the pipe mat of FIG. 1.
Figure 5:
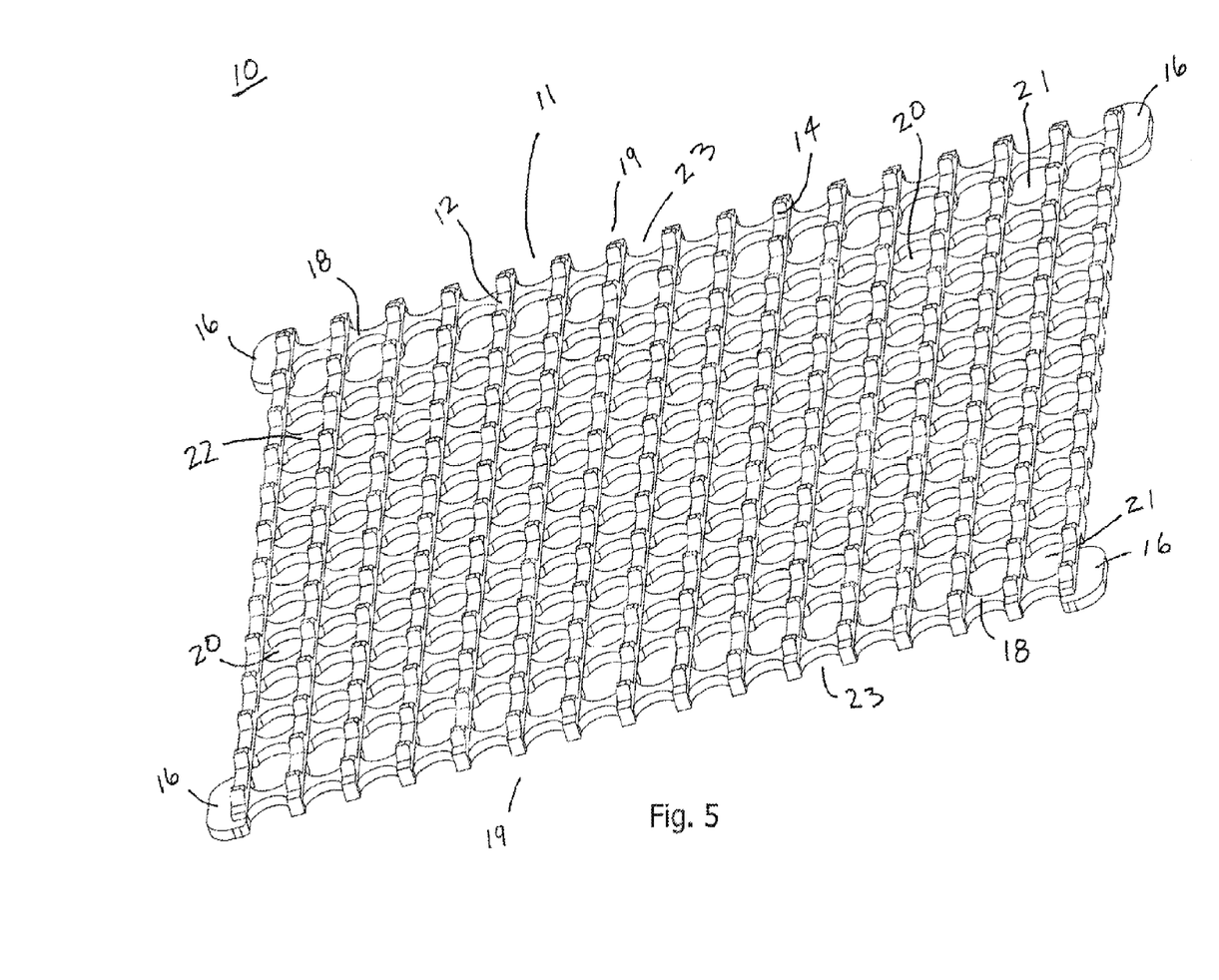
FIG. 5 is a top perspective view depicting the pipe mat of FIG. 1.
Figure 6:
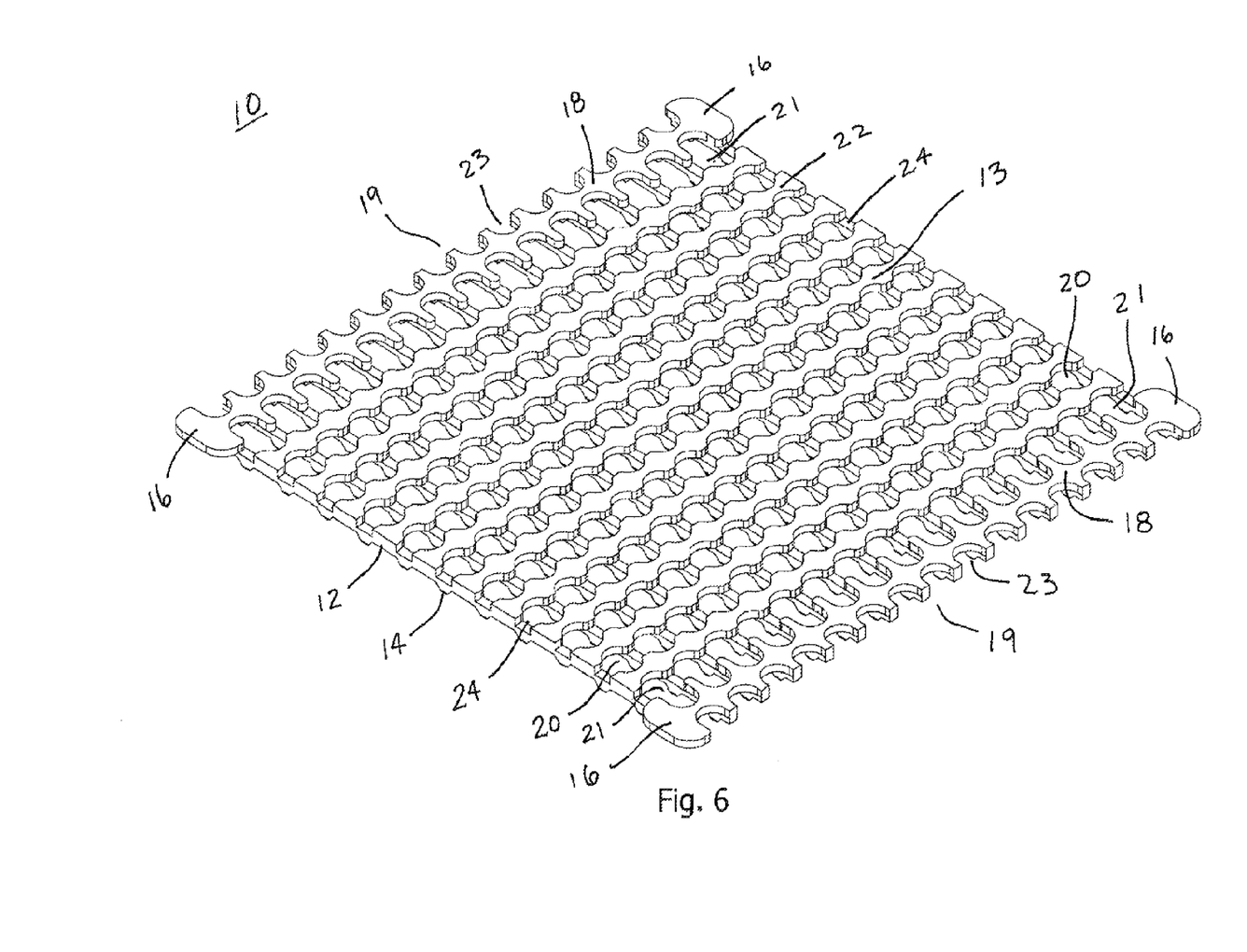
FIG. 6 is a bottom perspective view depicting the pipe mat of FIG. 1.

Referring to FIGS. 1 to 6, one embodiment of pipe mat 10 is shown. In some embodiments, pipe mat 10 can comprise a plurality of substantially parallel and spaced-apart nub rails 12 disposed on, or otherwise supported by or on, a plurality of substantially parallel and spaced-apart support rails 22, wherein support rails 22 can be substantially orthogonal to nub rails 12 thereby forming a lattice or matrix type structure. In some embodiments, each nub rail 12 can comprise a plurality of spaced-apart pipe nubs 14 extending upwardly therefrom. In some embodiments, each pipe nub 14 can comprise a triangular profile or cross-sectional shape, as shown in FIG. 4, for receiving an end of a drill pipe and prevent the drill pipe from shifting or moving on pipe mat 10, effectively holding the drill pipe in place. The spacing between nub rails 12, support rails 18 and 22, and pipe nubs 14 can be selected or chosen to accommodate standard sizes of drill pipe, as well known to those skilled in the art. The number of nub rails 12 and support rails 22 can be selected or chosen to hold accommodate any number of drill pipes, having consideration to the diameter size of the drill pipe.

In some embodiments, pipe mat 10 can further comprise an end support rail 18 that can be substantially parallel and spaced-apart from a support rail 22. In further embodiments, pipe mat 10 can comprise two end support rails 18, one on each opposing sides of pipe mat 10.

In some embodiments, pipe mat 10 can comprise a plurality of openings 20 disposed therethrough between upper surface 11 and bottom surface 13, each opening 20 disposed between a pair of adjacent nub rails 12. In some embodiments, support rails 22 can be configured with a repeating or sequential hourglass shape wherein each opening 20 can be approximately or substantially circular in shape or configuration. This configuration provides a balance between providing structural strength and rigidity for the lattice structure of pipe mat 10 and providing sufficient area for openings 20 to allow fluids to drain from drill pipe through openings 20 into a tubing tray that pipe mat 10 can be placed in.

In some embodiments, end support rails 18 can be configured to be disposed further apart from its adjacent support rail 22 than the spacing between adjacent pairs of support rails 22, wherein openings 21 disposed between end support rail 18 and its adjacent support rail 22 can be elongated and oval in configuration or shape. In further embodiments, end support rails 18 can further comprise a plurality of spaced-apart cutaways 23 disposed on outer edge 19 thereof to provide further drainage openings for fluids draining from a drill pipe placed on one of pipe nubs 14 disposed above an end support rail 18 to collect in a tray that pipe mat 10 is placed in. In further embodiments, each cutaway 23 can be disposed between adjacent pairs of nub rails 12. In yet further embodiments, each cutaway 23 can comprise a semi-circular configuration or shape a balance between providing structural strength and rigidity for the lattice structure of pipe mat 10 and providing sufficient area for each cutaway 23 to allow fluids to drain from a drill pipe into a tubing tray that pipe mat 10 is placed in.

In some embodiments, pipe mat 10 can comprise a plurality of drain channels 24 disposed on bottom surface 13 between each drain channel 24 disposed between adjacent pairs of support rails 22 or between an end support rail 18 and its adjacent support rail 22. In some embodiments, openings 20 and 21 can be in communication with drain channels 24.

In some embodiments, pipe mat 10 can comprise a bumper 16 disposed on one or more corners of pipe mat 10, as shown in FIGS. 1 to 6. Each bumper 16 can extend outwardly from an end support rail 18 and an outer most nub rail 12.

Figure 7:
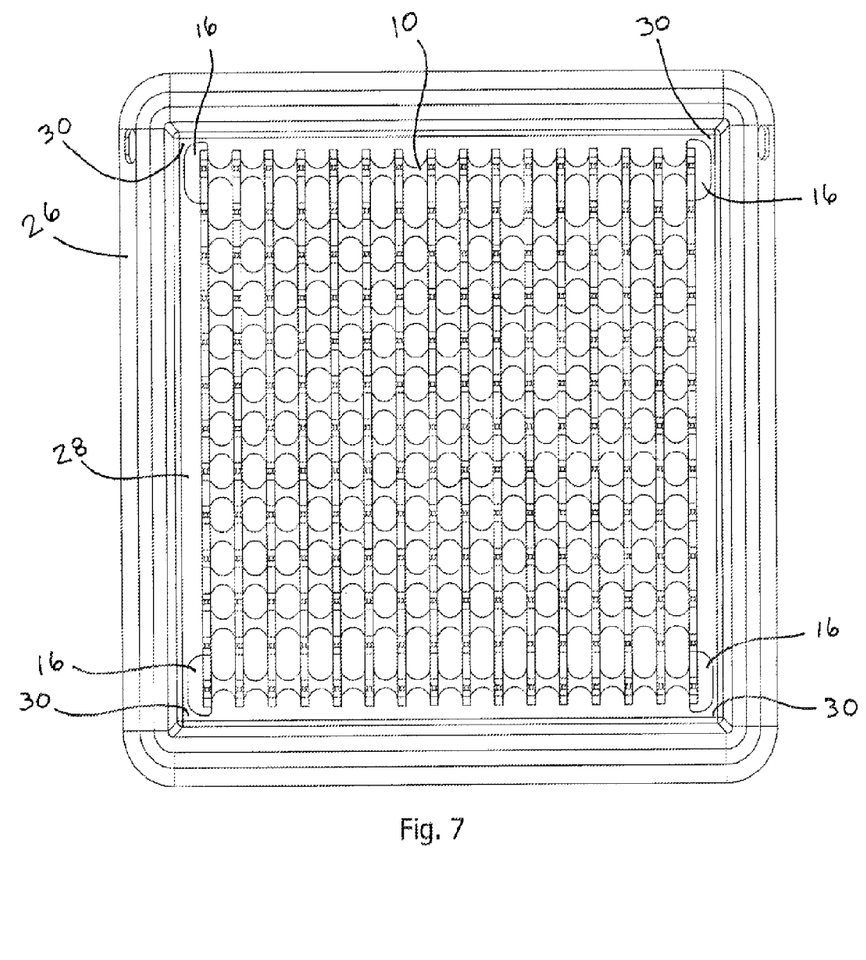
FIG. 7 is a top plan view depicting the pipe mat of FIG. 1 in a tubing tray.

Referring to FIG. 7, in some embodiments, bumpers 16 can be used to center pipe mat 10 in tubing tray 26, which can be sized to receive pipe mat 10. By providing bumpers 16, bumpers 16 can prevent pipe mat 10 from sliding or shifting within basin 28 of tubing tray 26, as drill pipe is placed onto or removed from pipe mat 10, by contacting inner corners 30 as a means to keep pipe mat 10 centered within tubing tray 26.

Figure 8:
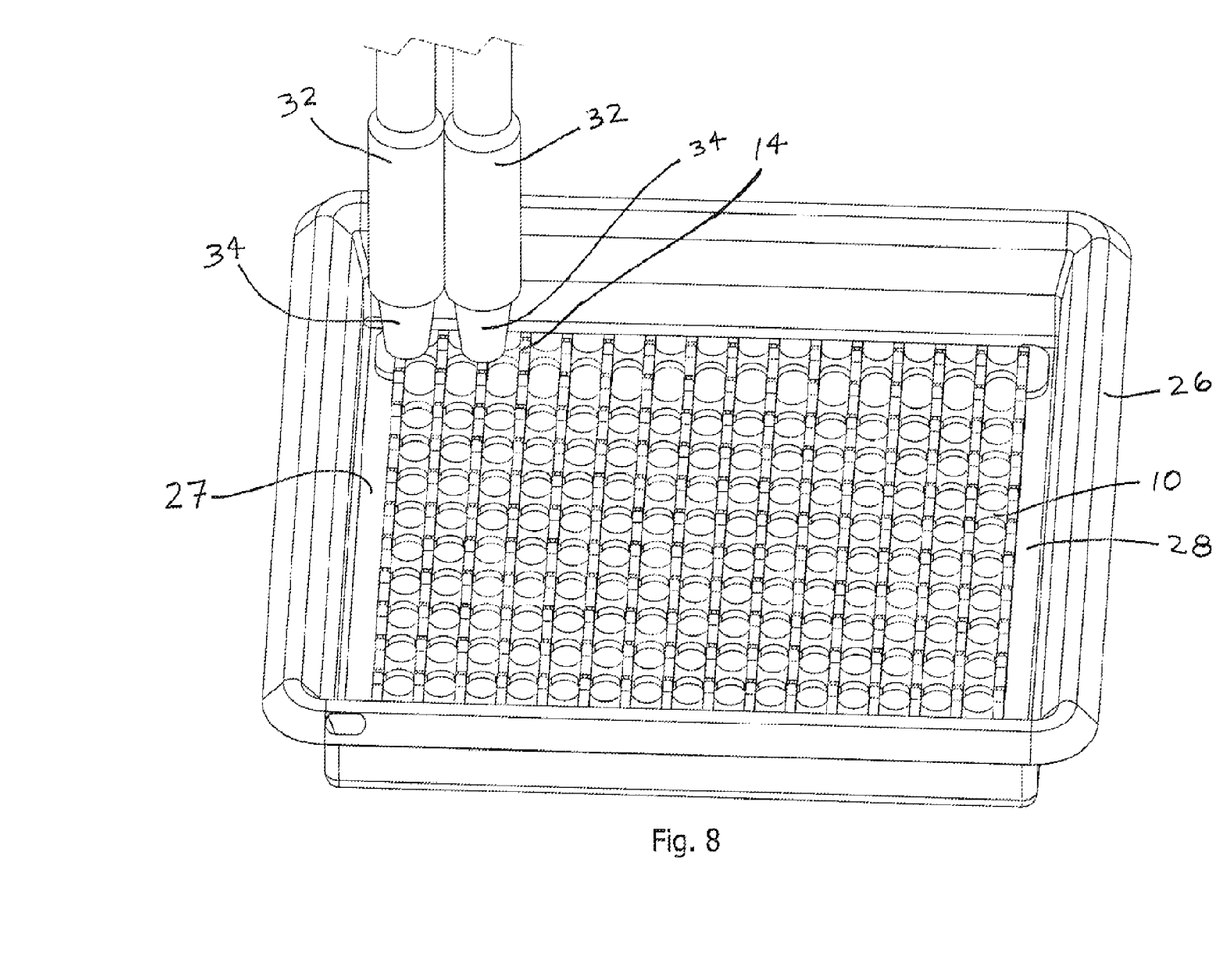
FIG. 8 is a perspective view depicting the pipe mat of FIG. 7 with drill pipe standing thereon.

Referring to FIG. 8, pipe mat 10 is shown placed in tubing tray 26 with pieces of drill pipe 32 placed on pipe mat 10 wherein end 34 of each drill pipe 32 can be placed onto a pipe nub 14, which can hold drill pipe 32 in place and prevent it from moving or shifting once placed on pipe mat 10. When drill pipe 32 is tripped out of a drill string, any residual drilling fluid or produced substances in drill pipe 32 can drain therefrom and pass through openings 20 and 21 disposed in pipe mat 10 to collect in drain channels 24 while holding drill pipe 32 above bottom surface 27 of basin 28. In so doing, the drained fluids can be contained in tubing tray 26 for recycling or proper disposal when all of the pieces of drill pipe 32 have been removed therefrom.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A method for collecting fluids draining from drill pipe tripped out of a drill string on a drilling rig, the method comprising the steps of:
    a) providing a pipe mat for use with a tubing tray for receiving, organizing and storing drill pipe thereon, the pipe mat comprising:
        (i) a plurality of support rails, spaced so that each adjacent pair of support rails in combination with the tubing tray defines a respective drain channel;
        ii) a plurality of nub rails disposed or supported on the plurality of support rails, the plurality of nub rails forming a lattice or matrix-type structure in combination with the support rails defining openings in communication with the drain channels; and
        iii) a plurality of spaced-apart pipe nubs extending upwardly from at least one of the plurality of nub rails, the pipe nubs configured to hold a drill pipe in place when an end of the drill pipe is placed onto one of the pipe nubs;
    b) placing the pipe mat into the tubing tray; and
    c) placing an end of a drill pipe tripped out of the drill string onto one of the pipe nubs disposed on the pipe mat, wherein fluids disposed within the drill pipe can drain from the drill pipe through the openings into the drain channels and collect in the tubing tray.

2. The method as set forth in claim 1, wherein each of the pipe nubs comprises a triangular profile or cross-sectional shape.

3. The method as set forth in claim 1, wherein each of the openings comprises a substantially circular configuration or shape.

4. The method as set forth in claim 1, further comprising a corner bumper disposed on at least one corner of the pipe mat.

5. The method as set forth in claim 1, wherein at least one of the support rails is configured as an end support rail.

6. The method as set forth in claim 5, wherein the openings disposed between at least one of the end support rails and its adjacent support rail comprise an elongated or oval configuration or shape.

7. The method as set forth in claim 5, wherein at least one of the end support rails comprises a plurality of cutaways disposed along an outer edge thereof.

8. The method as set forth in claim 7, wherein the cutaways comprise a semi-circular configuration or shape.

* * * * *